April 2, 1946.  D. C. OLMORE  2,397,687
ORDNANCE MOUNT
Filed Oct. 9, 1943  2 Sheets-Sheet 1

Duane C. Olmore INVENTOR.
BY James M. Clark
His Patent Attorney

April 2, 1946.　　　D. C. OLMORE　　　2,397,687
ORDNANCE MOUNT
Filed Oct. 9, 1943　　　2 Sheets-Sheet 2

Duane C. Olmore INVENTOR.
BY James M. Clark
His Patent Attorney

Patented Apr. 2, 1946

2,397,687

UNITED STATES PATENT OFFICE 2,397,687

ORDNANCE MOUNT

Duane C. Olmore, Los Angeles, Calif., assignor to North American Aviation, Inc., Inglewood, Calif., a corporation of Delaware Application October 9, 1943, Serial No. 505,595

9 Claims. (Cl. 89—37.5)

The present invention relates to ordnance and more particularly to an adjustable front mounting arrangement for the fixation of cannon, machine gun and other type armament installations in aircraft, tanks and other combat vehicles.

The present invention relates to that type of ordnance which is fixedly attached to the airplane or other combat vehicle and is generally referred to as a "fixed" gun or cannot, although some means of adjustment is usually provided to vary the relationship of the gun axis with the supporting structure to which it is locked or fixed before the vehicle carrying the gun goes into action. In such fixed guns the aiming or training of the gun is usually accomplished by movement of the airplane, or vehicle, or the turret to which the gun is attached, in order to direct the gun fire toward the target. The "fixed" type gun is distinguished from the so-called "flexible" type which is mounted to permit independent aiming movements regardless of the position of the aircraft or vehicle with respect to the target.

In installations of fixed aircraft cannon and machine guns, to which the present invention more particularly relates, these guns may either be positioned to fire through a hollow propeller shaft, through the propeller disc between the propeller blades, or forwardly from the leading edge of the wing. Such wing mounted guns are frequently mounted such that the axes of their barrels lie in the same horizontal plane parallel to the horizontal axis of the aircraft but converge forwardly such that they usually intersect the vertical plane of symmetry of the aircraft at a predetermined distance forward of the same. Due to variations in manufacture of the wings of the airplane and the mounting fittings which are supported therefrom, it is usually necessary that some means of adjustment be provided to mount the gun such that it is properly trained or aimed with respect to the airplane. The fixed guns and cannon of aircraft are mounted such that their lines of fire are directed along predetermined axes with respect to the airplane upon which they are carried and which necessarily is aimed at the target by positioning the airplane along reference points which are remote from the fixed guns, but which necessarily bear a fixed and accurate relationship thereto. The present invention relates more particularly to improvements in the adjustable front mount for such guns.

It is a major object of the present invention to provide a relatively simple, light and sturdy front mount for a fixedly mounted cannon or machine gun which is readily capable of accurate adjustment. It is also an object to provide an eccentric type adjustable front mount including a ball and socket or universal joint arrangement which is adapted to provide a double eccentricity whereby either horizontal or vertical adjustments or any intermediate combination or component thereof may be readily secured in the positioning of the gun axis.

It is a further object to provide an adjustable front mount for a heavy calibre gun in which the mount is adapted for use with the more frequently used gun adapters and recoil mechanisms and which is readily removable from the supporting structure to facilitate access to or removal of the gun from the vehicle. It is also an object to provide a suitable front mount arrangement which readily lends itself to a rugged support cantilevered from the leading edge of the wing and which is adapted to be faired into an enclosing fairing which maintains the resistance of the supporting and adjusting structure reduced to a minimum.

Further objects reside in the form and relationship of the several parts comprising the adjustable gun mount and its supporting structure and the simplicity of the adjusting and locking mechanisms and operations to which it is adapted. Other objects and advantages of the present invention will become obvious to those skilled in the art after a reading of the present disclosure, but all are intended to come within the scope and spirit of the present invention as hereinafter more particularly described.

In the drawings forming a part of this description:

Figure 1:
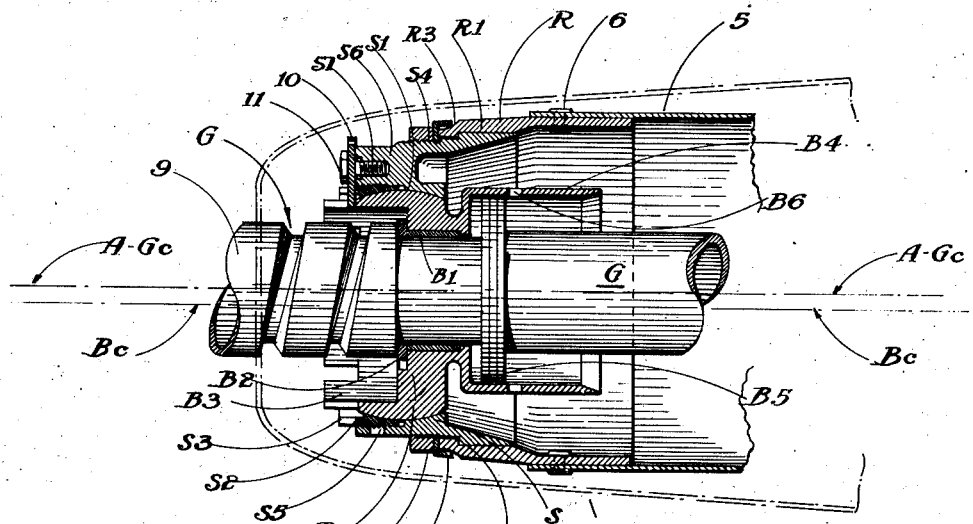
Fig. 1 is a cross-sectional side elevation of one form of my adjustable front mount arrangement.

Referring now to Fig. 1, a heavy calibre gun or cannon G is shown adjustably supported within the tubular structure 5 cantilevered forward of the supporting structure, which in the present instance might be the leading edge or front spar of an aircraft wing. A tubular member or ring R is fitted within the tubular structure 5 in a telescoped relationship in which it is fixedly attached as by the peripheral row of rivets 6. The ring R is provided with a concentric bore R1 and a forwardly extending bore of lesser diameter provided with an intermediate shoulder at R2. In this figure the axis A—A represents the normal or central position of the gun G in which it coincides with the axis Gc thereof; the axis A—A and the coinciding axis Gc in this position being also the axis of the concentrically disposed ring R and tubular support 5.

The socket member S has an external diameter adapted to closely fit within the bore R1 of the ring R with a corresponding transverse shoulder adapted to abut at R2 and is provided with an external thread at S4 at its slightly reduced diameter portion. The socket member S is provided with a part-spherical internal surface at S1, the axis of which is eccentrically disposed within the bore R1. The socket member S has a forwardly extending sleeve portion radially apertured at S5 and internally threaded for engagement with the external threads of the spherical retainer element S2. The apertures S5 permit engagement by a spanner wrench and the element S2 is provided wtih forwardly directed teeth S3 by which it is also engaged by a spanner or other wrench for rotation of the retainer element.

The inner surface of the element S2 is provided with a part-spherical surface finished to a like diameter as the corresponding surface of the socket member S and in cooperation with which it forms a spherical socket housing for the intermediately disposed ball sleeve assembly B. The ring member R is provided adjacent its forward edge with a series of indented recesses R3 which are adapted to be engaged by the tongue retaining ring 7 which in turn is fixedly held in its locking position by means of the internally threaded locking ring 8. The locking elements 7 and 8 accordingly are adapted to fix the relationship, both rotationally as well as axially, of the ring member R and the socket member S. The retaining ring 8 is preferably provided with a plurality of radially disposed apertures (not shown, but similar to the holes S5) which may be engaged by a spanner or other wrench for rotating the ring into its tightened or removed positions.

The inner sleeve or ball element B is provided with a stepped internal bore adapted to receive the bushing B1 and the thrust ring B2 which is engaged by the squared end of the recoil spring 9 helically wound about the barrel of the gun G. The ball element B and its bushing B1 rotatably engages the barrel of the gun G. As indicated above, the ball member B is provided with a part-spherical convex external surface which is closely fitted and retained within the corresponding concave surface S1 formed by the socket assembly S and S2 such that it is firmly retained thereby, securing the forward portion of the gun G in its adjusted position and transmitting recoil and other forces from the gun barrel directly through the mounting mechanism to the tubular supporting structure 5. By backing-off or unscrewing the retainer S2 a slight amount the ball element B is freed such that it is rotatably and universally adjustable within the socket member S and about the barrel of the gun G. The ball member B has a counterbored portion facing forwardly which terminates in the recessed tongue portion B3 by means of which this ball member can be held or rotated by a suitable wrench into its adjusted position. It will be noted from Fig. 1 that the central axis of the internal bore B1 of the ball member B is eccentrically disposed above the axis Bc of its spherical outer surface such that the central axis of its inner bore B1 coincides with axis A—A or that of the gun centerline Gc; and the eccentric axis of its outer spherical surface, or the line upon which the center of the spherical surface is located, falls on the line Bc—Bc which is disposed below the axis A—A.

For assisting the recoil spring 9 of the gun and aiding in the snubbing of its axial movements, the inner hub portion of the ball member B is provided with a cylindrical dashpot portion B4 within which the piston B5 is adapted to move in an axial direction, the dashpot action being assisted by the metering effect of the radially disposed holes B6 within the dashpot casing B4. The socket member S is provided with a forwardly projecting boss portion S6 provided with a plurality of tapped holes S7 engageable by the locking screw 11 which retains the latch plate lock 10 as its depending portion projects into the notches in the ball and socket portions B3 and S3 to thereby prevent relative rotation therebetween.

The position of the gun G in Fig. 1 would be its normal or central position in which the gun centerline Gc is alined with the axis A—A of the mounting structure 5. This results from the condition that the eccentricity of the socket member S is equal to and is offset or compensated for, by the equal amount of eccentricity in the ball member B. In other words, the axis of the outer surface R1 of the socket member S is disposed above the centerline of its concave spherical inner surface S1 by the same amount which the convex spherical outer surface of the ball member B is disposed below the axis of the internal bore B1 of the ball member.

Figure 2:
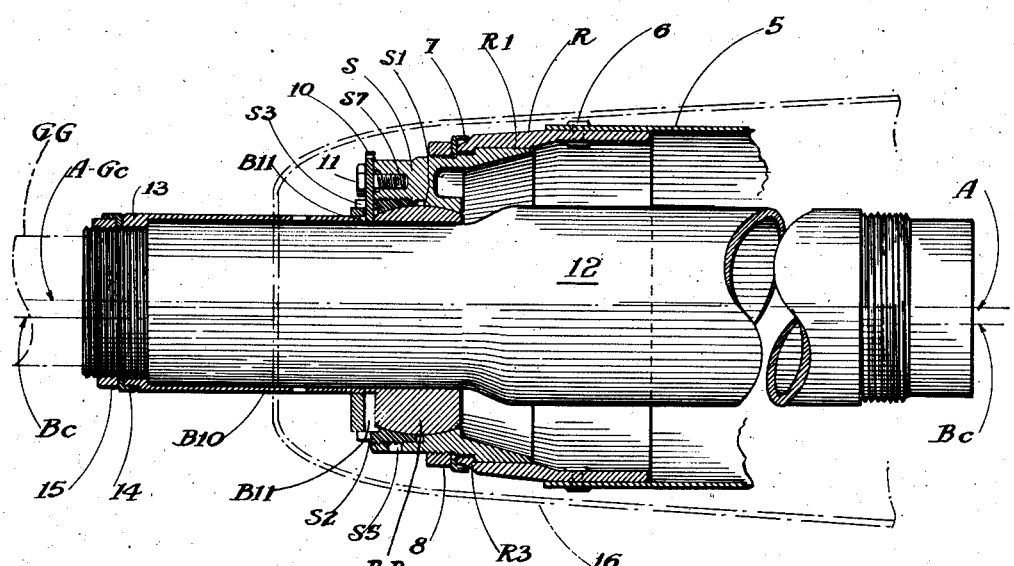
Fig. 2 is a similar view of a modification of my invention as applied to a cannon having a different type adapter.

In Fig. 2 there is shown a modification of my adjustable front gun mount arranged to adjustably accommodate an Edgewater ring spring gun adapter 12 for the aircraft cannon GG. The elements in this modification correspond closely to those in Fig. 1 and while they vary somewhat in form they have been designated by similar letters. The ball element BB in this modification is provided with a forwardly extending tubular portion B10 provided with radially disposed orifices B11 adjacent its spherical surface adapted to receive the tongue portion of the radially extending lock 10 retained by the threaded bolt 11. The forward end of the tubular portion B10 is internally threaded to engage the threaded portion 13 of the adapter 12 to which it is retained by the tongue ring 14 and the internally threaded locking ring 15. The tongue ring 14 is bent over into recesses in the ends of the tube B10 very much like the ring 7 engages the recesses R3 in the ring R.

Figure 3:
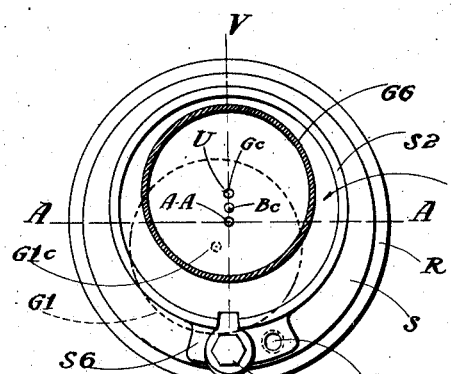
Fig. 3 is a diagrammatic front elevation as viewed looking toward the front of the mount showing the gun adjusted into its upwardly aimed position.
Figure 4:
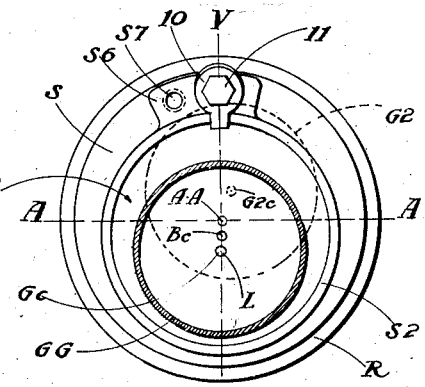
Fig. 4 is a similar front elevational view showing the gun adjusted into its downwardly aimed position.
Figure 5:
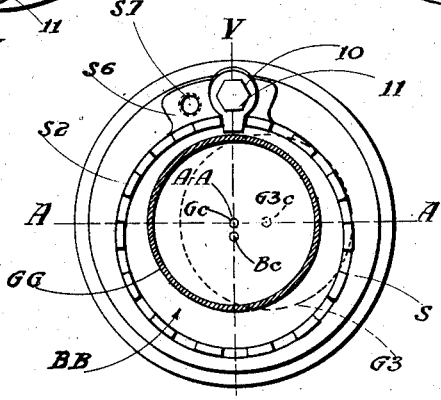
Fig. 5 is a similar front elevation showing the gun in its normal or central position corresponding to that shown in the side elevation in Fig. 2.

Referring now to the diagrammatic front elevations in Figs. 3, 4 and 5, it will be seen that each assembly has been simplified to show merely the outer ring R; the socket member S on which is provided the lug or boss S6 and the tapped holes S7 adapted to receive the latch plate 10 and the lock bolt 11; the socket retainer ring S2; the ball element BB and the tubular wall B10 of the ball member which is concentrically disposed about the gun barrel and the axis Gc, and for simplicity has been marked GG in these three figures. In these diagrammatic figures the horizontal axis indicated in Fig. 2 (which is the side elevation corresponding to Fig. 5) represents a horizontal plane which intersects the vertical plane V—V along the axial line A—A shown in Fig. 2.

Figure 6:
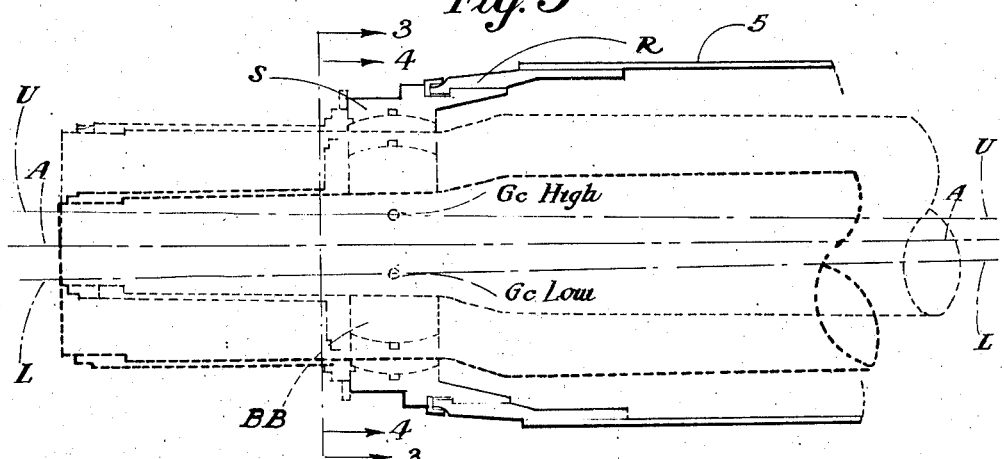
Fig. 6 is a composite diagrammatic side elevation of the relationship of the gun shown in Figs. 3 and 4 to the supporting mount.

In Fig. 3 there is represented the position of the gun GG when the eccentric ball element BB has been rotated with the center of its outer spherical surface in the highest possible position or, in other words, when the thickest portion of its wall is rotated to the lowest possible position. At the same time the socket member S has been rotated such that its spherical surface S1 and the opening which it forms has been rotated into its uppermost position into which it carries the aforementioned ball member BB. In this position of the socket member its thickest wall portion, at which the locking boss S6 is located, is moved into the lowest possible position. This has the effect of bringing the center of the gun Gc at the transverse plane passing through the center of the spherical surfaces upwardly along the vertical axis V—V to the point indicated at U in Fig. 3. It should be mentioned at this point that all adjustments of the gun GG are made at the forward mount and that the rear of the gun does not move. The rear mount of the gun is preferably arranged such that a given point is releasably retained as the remainder of the gun is adjustably rocked back and forth, the front of the gun passing through a number of points circularly describing a cone whose apex is the virtual point of support at the rear mount, or radially across the intersection of the vertical and horizontal axes V—V and A—A. In other words, the axis Gc of the gun is tilted upwardly about the aforementioned apex as a pivot as the eccentric ball and socket elements are rotated into the positions indicated in Fig. 3, and the side elevation of the gun in this attitude is indicated by the upper set of dotted outlines in the elevation shown in Fig. 6.

Fig. 4 represents the lower position of the gun GG resulting from the rotation of the two eccentric members through 180 degrees from their positions indicated in Fig. 3. This has the effect of bringing the centerline of the spherical surfaces Bc to a point below the horizontal plane AA and the center of the gun Gc to an even lower position as indicated at L. This position of the gun is represented in the elevation in Fig. 6 by the lower set of dotted outlines symmetrically disposed about the forwardly and downwardly inclined axis L—L.

In the diagrammatic Fig. 5 the outer socket member S has been retained in the position shown in Fig. 4 and the inner ball member BB has again been rotated through 180 degrees to the position in which it was initially shown in Fig. 3. This has the effect of raising the centerline Gc of the gun to the point where its eccentricity in the ball BB offsets and cancels that of the socket S such that Gc coincides with the longitudinal or normal axis A—A, corresponding to the side elevation of the gun in its supporting mount as shown in Fig. 2.

It will be obvious from an examination of Fig. 3 that as the socket member S is rotated about its axis A—A within the ring element R the centerline Bc of its eccentrically disposed spherical opening S1 is rotated along the circumference of a circle whose center is located at A—A and whose radius is equivalent to the distance from A—A to Bc. Similarly, as the inner ball member B is rotated about this movable series of centers, or loci of centerlines, the center Gc of the gun can also be made to take any position along the circumference of a circle whose radius is equivalent to a distance from Bc to Gc. It will accordingly be seen therefore that the axis Gc of the gun can be made to define any one of an infinite number of diverging lines within a cone of adjustment, the apex of which would be the aforementioned virtual center point or apex at the rear mount of the gun. These various positions of adjustment of the centerline of the gun may be obtained by rotating each of the eccentric elements either in the same or in opposite directions from the normal position shown in Fig. 5 in which the eccentricity of the socket element S is offset or compensated for by the like eccentricity of the inner ball element BB.

It will therefore be obvious to those skilled in the art that a position of the gun centerline as indicated in Fig. 3 at the point G1c may be obtained by rotating the thickest portion of the socket member S into the upper right hand portion of this figure and substantially maintaining the relationship of the ball member BB within the socket member S. Obviously any number of adjusted positions may be obtained about the new center of the socket member S by rotating the ball member within the same. Similarly a position of the gun center as indicated at G2c in Fig. 4 may be obtained by rotating the socket member S such that its thickest portion would be located below the center axis A—A and somewhat to the left of the vertical plane V—V until the desired position of adjustment is reached. To obtain the position of the gun center G3c as indicated in Fig. 5 it is merely necessary to retain the ball and socket members in the relative position shown in Fig. 3 and rotate the same within the cylindrical bore R1 of the ring until the latch mechanism would appear at the left of the figure and the centerline of the gun would be withdrawn to its maximum distance of eccentricity to the right of the vertical plane V—V as indicated by G3c in Fig. 5.

It will be noted that two tapped holes S7 are provided in the boss S6 such that a relatively fine adjustment may be made by shifting the latch 10 to the hole which comes nearest to being alined with a notch in the locking ring S2. In order to make any of the aforementioned adjustments in the position of the gun G it is merely necessary to back off the threaded retaining ring 8 to release the tongue ring 7 to permit relative rotation between the socket S and the ring R, and to remove the bolt 11 and latch plate 10 which permits relative rotation to take place between the socket portion S2 and the ball member BB. It will be noted that the gun is at all times securely embraced by either the bushing B1 of the modification in Fig. 1, or the ball sleeve B10 and the adapter 12 retained by the locking elements 14 and 15 of the modification for the Edgewater adapter shown in Fig. 2. In adjusting the relative rotational positions of the ball and socket members the threaded socket portion S2 is backed off slightly to permit free sliding of the ball within the spherical surfaces of the socket and when the desired position of adjustment is obtained the element S2 is again tightened within its threaded connection to the socket as is also the retaining ring 8 and the gun is fixed in the adjusted position by the insertion of the locking plate 10 and its attachment by the bolt 11.

Although but two preferred forms of the present invention have been shown by way of illustration only, it will become obvious to those skilled in the art after a reading of the present specification and the attached drawings that various changes and modifications may be made which are intended to come within the scope of this invention as more definitely recited in the appended claims. While the invention has been shown and described as applied to a gun mounted forward of the leading edge of a wing, it is equally adapted for mounting at the leading edge or trailing edge of a wing or at any suitable position in a fuselage or other portions of the airplane. It is not necessarily limited to conventional forwardly firing guns of the fixed type but is equally applicable to rearwardly firing guns.

I claim:

1. In a fixed gun installation, a gun, a support structure, an outer member releasably attached to said support structure having an opening, an inner member having an external shape adapted to engage the opening in said outer member, said inner member having an eccentrically disposed bore, the said gun having a cylindrical portion in engagement with the eccentric bore of said inner member, and means carried by said inner member manually rotatable with respect to said outer member whereby the relationship of said gun is adjusted with respect to the said support structure.

2. In an adjustable support for a gun, a supporting member having a cylindrical bore, a socket member having a cylindrical external surface rotatably engageable with said supporting member bore and an eccentrically disposed part-spherical opening, a gun-attached member mounted in a supporting relationship about said gun axis having an external part-spherical surface adapted to universally engage the said part-spherical socket opening, means carried by said socket member manually rotatable with respect to said gun-attached and supporting members and locking means adapted to fix said gun with respect to the said rotated relationship of said engaging members.

3. In an adjustable support for a fixed aircraft gun, a supporting member having a cylindrical portion, a socket member having a cylindrical surface rotatably engageable with said cylindrical portion of said supporting member, said socket member also having a part-spherical opening eccentrically disposed with respect to the axis of its cylindrical portion, a gun-attached member rotatably mounted in a supporting relationship about said gun axis having an external part-spherical surface adapted for rotational and tilting engagement with the said part-spherical socket opening, means carried by said socket member manually rotatable with respect to said supporting member, and tongue means carried by said gun-attached member manually rotatable with respect to said gun and to said socket member whereby the axis of said gun is adjustable both with respect to said supporting member and with respect to said part-spherical socket opening.

4. In an adjustable support for a fixed aircraft gun, a supporting member having a cylindrical portion, a socket member having a cylindrical surface rotatably engageable with said cylindrical portion of said supporting member, said socket member also having a part-spherical opening eccentrically disposed with respect to the axis of its cylindrical portion, a gun-attached member rotatably mounted in a supporting relationship about said gun axis having an external part-spherical surface adapted for rotational and tilting engagement with the said part-spherical socket opening, means carried by said socket member manually rotatable with respect to said supporting member, and locking means adapted to fix the position of said gun with respect to said supporting member.

5. In an adjustable support for a fixed aircraft gun, a supporting member having a cylindrical portion, a socket member having a cylindrical surface rotatably engageable with said cylindrical portion of said supporting member, said socket member also having a part-spherical opening eccentrically disposed with respect to the axis of its cylindrical portion, a gun-attached member rotatably mounted in a supporting relationship about said gun axis having an external part-spherical surface adapted for rotational and tilting engagement with the said part-spherical socket opening, means to rotate said socket member with respect to said supporting member, locking means adapted to fix the position of said gun with respect to said supporting member, and indentation means carried by said gun-attached member manually rotatable with respect to said gun and its rotation and oscillation with respect to said socket member whereby the axis of said gun is adjustable both with respect to said supporting member and with respect to said part-spherical socket opening.

6. In a fixed gun installation for aircraft, an adjustable gun mount comprising a support structure having a cylindrical bore, an outer member rotatable within said support member bore having an eccentrically disposed part-spherical opening, an inner member having an external part-spherical portion adapted to rockably and rotationally engage the said opening in said outer member, said inner member having an eccentrically disposed bore, the said gun having a cylindrical portion in supporting engagement with the eccentric bore of said inner member, means carried by said inner member manually rotatable with respect to said gun for its adjustment with respect to the part-spherical opening in the said outer member and means associated with said outer member manually rotatable with respect to said inner member and supporting structure for the adjustment of said inner member with respect to said supporting structure.

7. In a fixed gun installation for aircraft, an adjustable gun mount comprising a support structure having a cylindrical bore, an outer member rotatable within said support member bore having an eccentrically disposed part-spherical opening, an inner member having an external part-spherical portion adapted to rockably and rotationally engage the said opening in said outer member, said inner member having an eccentrically disposed bore, the said gun having a cylindrical portion in supporting engagement with the eccentric bore of said inner member, means carried by said inner member manually operable with respect to said gun for its adjustment with respect to the part-spherical opening in the said outer member, means carried by said outer member manually operable with respect to said inner member and supporting structure for the adjustment of said inner member with respect to said supporting structure, and means adapted for the locking of the said members in their adjusted relationship.

8. An adjustable mount for a gun comprising a tubular supporting member having a cylindrical bore, an inner member rotatably supported within said supporting member bore having an eccentrically disposed opening, means rotatably carried by said gun having a portion rockably and rotatably engageable with said eccentrically disposed opening of said inner member whereby rotation of said inner member is adapted to change the position of said gun with respect to said supporting member bore, and means to lock said inner member to both said supporting member and to said gun-carried means.

9. In a mount for a fixed gun, a supporting ring having a cylindrical surface, a socket member rotatably supported by the cylindrical surface of said ring having a part-spherical opening therein, a ball member rotatably carried upon said gun having an outer part-spherical surface engageable with said socket opening, the axis of said gun being eccentrically disposed with respect to said outer part-spherical surface of said ball member, and recessed tongue portions arranged upon said ball member manually rotatable with respect to said socket member to adjust the position of said gun with respect to said supporting ring.

DUANE C. OLMORE.

Certificate of Correction

Patent No. 2,397,687.　　　　　　　　　　　　　　　　　　　　April 2, 1946.

DUANE C. OLMORE

It is hereby certified that errors appear in the printed specification of the above numbered patent requiring correction as follows: Page 4, second column, lines 70 and 73, claim 7, for the word "operable" read *rotatable*; and that the said Letters Patent should be read with these corrections therein that the same may conform to ther record of the case in the Patent Office.

Signed and sealed this 1st day of October, A. D. 1946.

[SEAL]

LESLIE FRAZER,
*First Assistant Commissioner of Patents.*